UNITED STATES PATENT OFFICE.

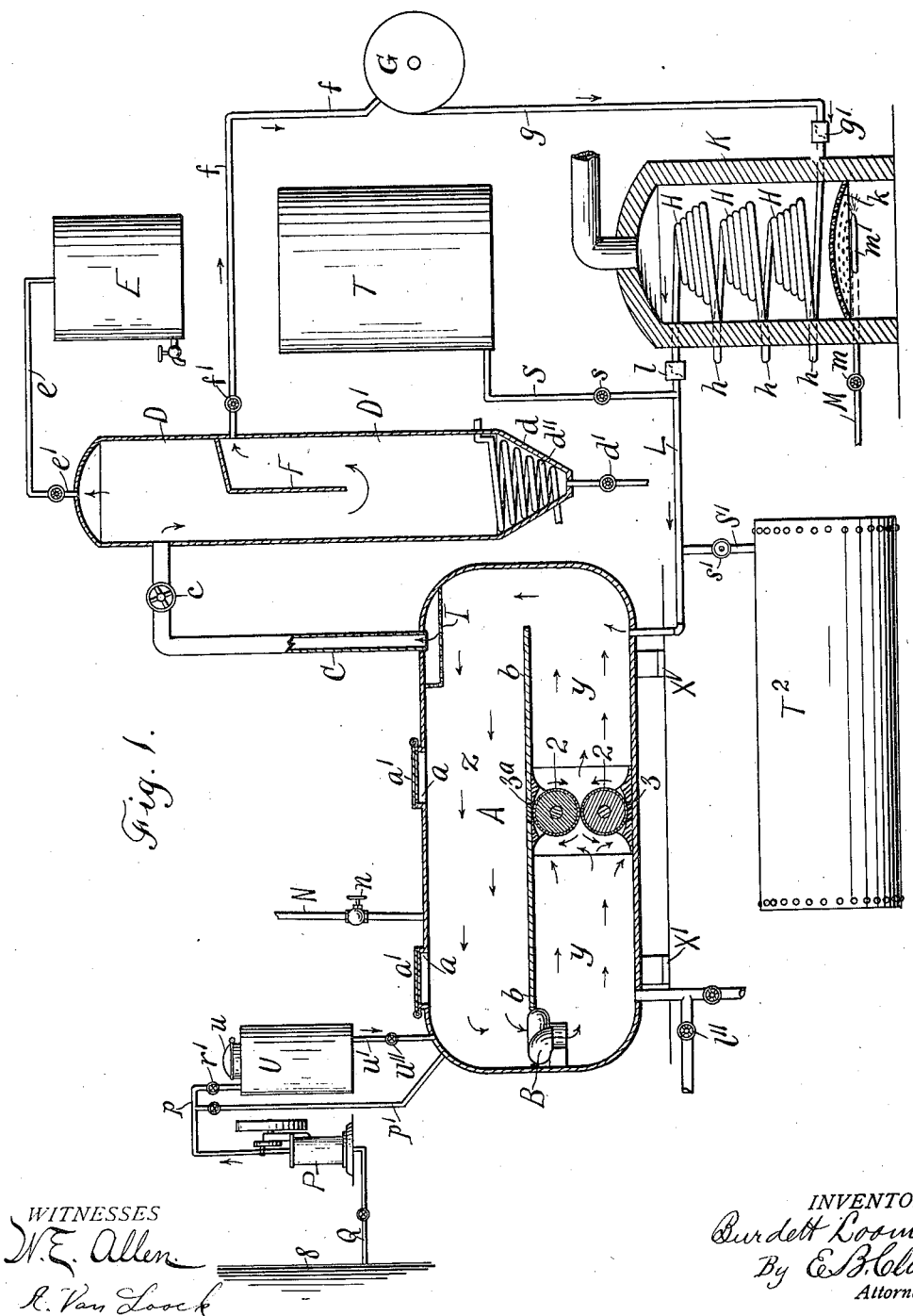

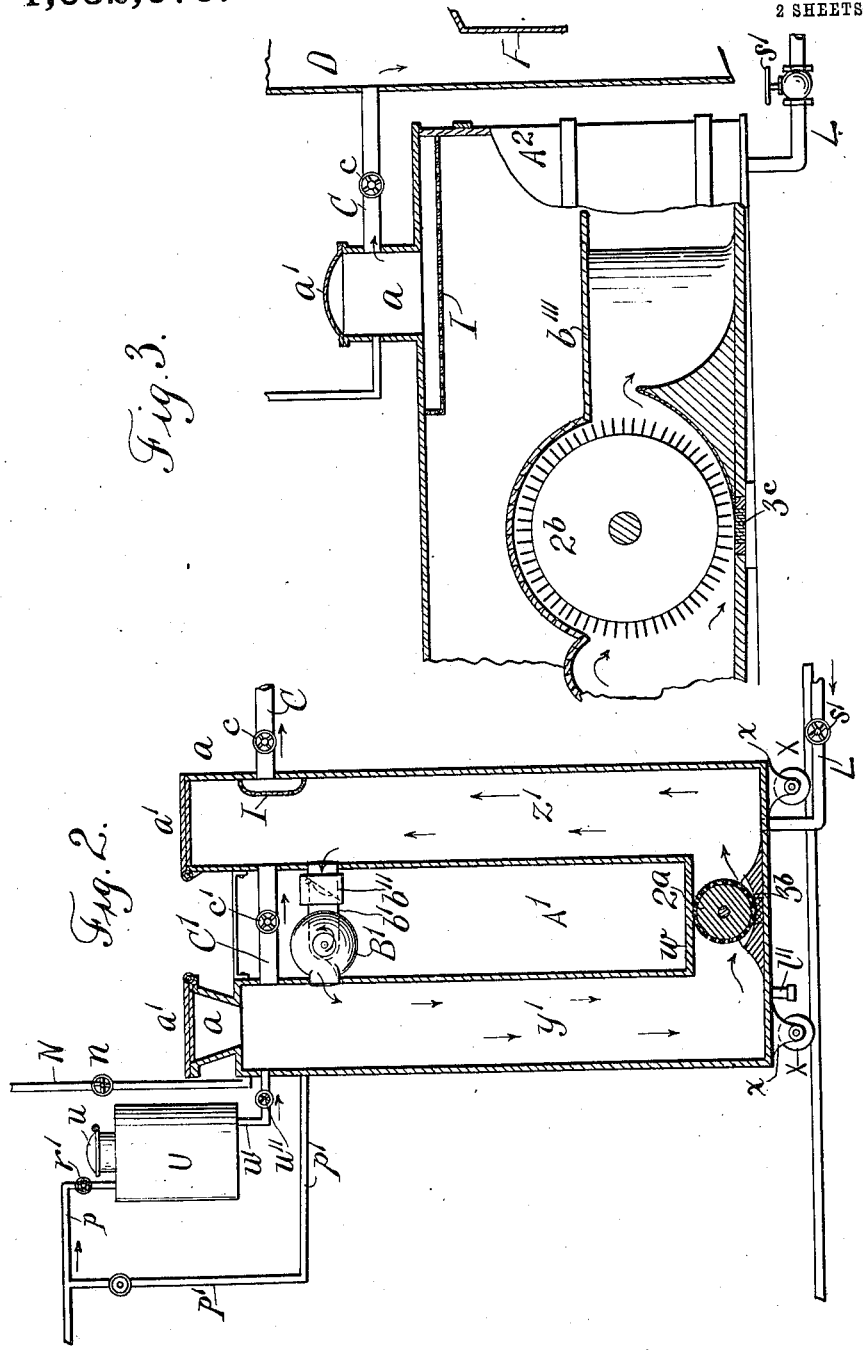

BURDETT LOOMIS, OF HARTFORD, CONNECTICUT.

PROCESS OF MAKING CELLULOSE.

1,052,675.  Specification of Letters Patent.  Patented Feb. 11, 1913.

Application filed April 26, 1912. Serial No. 693,445.

*To all whom it may concern:*

Be it known that I, BURDETT LOOMIS, a citizen of the United States, residing at Hartford, in the county of Hartford and State of Connecticut, have invented certain new and useful Improvements in Processes of Making Cellulose, of which the following is a specification.

This invention relates to treating wood and plants to extract natural constituents and reduce the fiber to cellulose ready for making paper, directly in a beating engine.

The principal object of my invention is to provide a method for economically and rapidly reducing ligneous material and plants to the condition of pulp or cellulose, and ready for paper making, directly in a beating engine, and at the same time separate and save from the raw material the various valuable constituents in condition for economic uses in the industrial arts, whereby great economy is effected in the process and greatly improved products are obtained.

A special object is to provide for dissolving and extracting all resinous and gummy material from wood or plants while circulating with hot water or a solvent liquor in a beating engine, and while being reduced to pulp with, or without alkaline chemicals, and subsequently washing and bleaching, if required, directly in the beating engine till ready for paper making.

Another object is to produce an improved quality of cellulose, with a comparative long, strong fiber from any given kind of ligneous material or plants, and to utilize all, so-called, waste material incident to the process, so as to reduce the cost of the cellulose to the minimum.

Other objects and purposes of my invention will appear and be understood from the following detailed description of the process in connection with drawings which illustrate forms of apparatus which may be used for carrying out the process.

Different kinds of wood and plants contain a variety of constituents, such as tannic and other acids, gums, wax, turpenes, oils and resinous substances, according to the character or kind of wood or plant, which substances are not useful or desirable in cellulose for making paper, and are, in fact, detrimental thereto,—but which, if separated from the wood and from one another, are quite valuable for use in the arts, and which when separated, leave the fiber of wood or plants in the cleanest and best condition for making superior pulp or cellulose, with a reduced expenditure of time and labor and a reduced percentum of chemicals, heretofore required for that purpose.

I preferably first remove tannic acid from the wood or plant material, as it can be extracted at a low temperature, between 120° and 170° F., and if left in the wood during the pulping operation, combines with the fiber, imparting thereto a dark color, and cannot then be washed out with water alone, but must be removed by alkali and bleaching agents, entailing additional expense.

By heating wood to a moderate temperature, ranging between 215° and 245° F., decomposition is set up, resulting in the formation of a number of acids of the fatty acid series and by raising the temperature there are formed other fatty acids. The formation of fatty acids, among which acetic acid appears in largest quantity, commences, according to Gillot, at 255° F. Other fatty acids are formed, such as formic acid, propionic acid, butyric acid, valeric acid, etc., at the above and higher temperatures. Simultaneously with the formation of these acids, carbonic acid, carbonic oxid and methane are evolved from the wood, and these bodies in a nascent state may act upon the acids so that the latter may undergo decomposition by more vigorous heating and a large number of products of decomposition may be formed. Among such products are found methyl alcohol (wood spirits), acetone, and metacetone, methyl acetic ether, aldehyde and dimethyl acetal. I have discovered that these above mentioned fatty acids, gases and other products of decomposition, when diffused in hot water, are an excellent solvent for the cellular structure, the gummy and resinous material found in wood and plants, and that, if the mixture or solution is circulated in contact with the wood or plants to be treated the contained resinous matter, oils and turpentine will be quickly liberated and may be drawn off with circulating water. The turpentine and more volatile oil will pass off in the form of vapor and will be condensed, and the rosin will pass off in a melted semi-liquid condition, and will be deposited and recovered. I have also discovered that the fatty acids and other solvents may be most effectively and economically produced and diffused in water by first heating fresh water and circulating it in contact with the wood, or plants, to be treated at gradually increasing temperatures, ranging from 212° to approximately 300° F. The volatile solvent is readily extracted from the wood or plants and diffused in the water and the mixture is passed from the wood treating tank through a heater where the temperature is raised and is then circulated up through the wood or plants. The circulation of the water and solvent in contact with the wood or plants and through the heater, the temperature being gradually increased, is continued till the solvent has liberated the turpentine, oil, rosin and gummy matter, and these valuable products have been recovered. The treatment may be continued for six to twelve hours, according to the character of the wood or plants and the temperature of the treating liquor.

By my process the pressure usually required for making pulp or cellulose will be much reduced, the time will be reduced and a smaller percentum of chemical reducing agent will be required to obtain the desired result; and the pulp or cellulose produced will be stronger and have better fiber than that produced by the ordinary process. The pulp or cellulose prepared by my process will also require much less bleaching powder or other agent to completely bleach it, by reason of the fact that the gums and coloring matter have been extracted.

I will now describe my process more in detail by reference to the accompanying drawings, in which—

Figure 1 represents in sectional elevation a form of apparatus in which my process may be carried out. Fig. 2 represents a vertical section of a modified form of treating tank and beating engine with parts in elevation, in which fiber material may be treated. Fig. 3 represents another modified form of treating tank and beating engine.

In the apparatus I provide four principal parts or devices consisting of a treating vat and beating engine A, an expansion and depositing chamber D, D', heating coils H located in a furnace below the bottom of tank A, and a condenser E, these parts being suitably connected by valved pipes and a circulating pump being used in the connecting pipes. The closed tank or vat A may be constructed of boiler iron or other suitable sheet metal with feet X', and has at the top two mouthpieces $a$ provided with covers $a'$. Instead of using a beating engine with the usual open vat, I provide a closed vat having a horizontal midfeather $b$, and two beating drums or rolls 2 mounted, one above the other on shafts which will be provided externally with driving gearing. The drums will be provided with the usual knives or cutters. A bottom bed plate 3, having the usual knives, is secured to the bottom of the tank and a similar plate $3^a$ is secured to the midfeather above the top drum. The drums will be geared to revolve in opposite direction from right to left as indicated by the arrows, so as to drive the water and contained material in contact with the plates 3, $3^a$ and through the compartment $y$ of the vat from left to right, and thence up through compartment $z$. In order to facilitate circulation I provide a rotary pump B in the passage between one end of the midfeather and end of the vat. The pump will in practice have a shaft passing through a stuffing box in the top or bottom plate of the vat. To the top of the vat is connected a water and vapor discharge pipe C, having a valve $c$, which connects with an expansion and depositing chamber D, D', at the top of which connects a vapor discharge pipe $e$ having a valve $e'$. The pipe $e'$ leads to a condenser E.

The expansion and depositing chamber D, D' is of a suitable height and diameter to provide for expansion of the vapors and partial cooling of the liquor to facilitate deposit of resinous or gummy material. At the lower end the chamber is made with tapering walls $d$, terminating with a discharge pipe having a valve $d'$ for drawing off gummy matter or rosin. A steam coil $d''$ is placed in the lower end of the depositing chamber D' for melting gummy or resinous material in case it becomes cold and hardened. At about middle height of chamber D, D' is placed a separating dome or hood F, which may be attached at its edges to the wall of the chamber, as shown in Fig. 1. In this construction the outlet pipe $f$ connects with the wall of chamber D' at the top of the dome and is provided with a valve $f'$. The dome F is located below the connection of the water and vapor discharge pipe C from vat or tank A and provides a vapor expansion chamber or space D above it, and a rosin depositing or catch-all chamber or space below it. This dome acts as a deflector and separator to cause the rosin or gummy matter to be deposited in the bottom of chamber D' while the water or treating liquor flows up into the dome and thence off to the circulating pump G. A positively acting rotary pressure pump is preferably used, though some other kind of positive pressure pump may be employed. A discharge pipe $g$ connects with the pump and leads to the lower end of a series of heating coils H suitably supported in a furnace K. These coils are connected in a series by means of return bends $h$ which extend through the wall of the furnace. Near the bottom of the furnace is provided a perforated arch $k$ for distributing the gas flame and protecting the lower heating coil. A fire chamber is provided below the arch hot water up through the chips or plant material in tank A, the rosin or gummy matter is carried upward and floated off with the water through pipe C into chamber D, D', where it is deposited.

The circulating hot water or solvent liquor in tank A agitates the body of chips or plants and prevents packing, and continuously carries away the extracted material so as to continuously bring fresh liquor into contact with the chips to effectively exert its solvent action on the cellular structure thereof and release the gummy and resinous constituents. In the expansion and depositing chamber D, D', the turpentine and oil vapor readily separate from the liquor, and at the same time the liquor is partially cooled so that the rosin or gum is hardened and will readily settle in the bottom of chamber D'. The velocity of the flow of liquor is much retarded in the expansion and depositing chamber, thereby facilitating the deposit of rosin. This action is also aided by the small overflow outlet pipe $f$ from the top of the separating dome F.

The temperature of the water or liquor may be gradually raised in the heating coils to approximately 300° F. As the operation progresses, the water or liquor becomes charged with an increasing percentage of fatty acids, gases, etc., and these act with increasing energy to dissolve, release, and extract the turpentine, oil and resin from the wood chips till they are substantially free from such constituents. The operation may be continued for a period varying from six to twelve hours, according to the character of the wood being treated. At suitable intervals, the valve $d'$ may be opened and the rosin discharged from the chamber D', but this may be mostly discharged at the end of the operation.

At any suitable stage in the operation, when the chips or plant material have become sufficiently softened and partially freed from gummy or resinous material the beating drum may be set in motion and the material subjected to beating, rubbing and grinding while at the same time the hot solvent liquor is circulated through the tank or vat. When the treatment and distillation of the wood in tank A is completed, the valve $c$ may be closed and the blow off valve $s$ opened, permitting the water or liquor containing the fatty acid to be blown off into the storage and settling tank T, where it is reserved for treating a succeeding charge of wood chips or plants in tank A. This blowing off operation may be facilitated by admitting compressed gas from pump P. The wood chips or other fibrous material in the treating tank will now be practically free from gum, resin, and oily matter, and the pores will be open so as to be readily permeated by caustic-soda solution or other alkaline solution. The cleaned chips or other fibrous material may be conveniently reduced to cellulose directly in tank or vat A, which now becomes a digester and beating engine, by admitting fresh water through pipe N and the desired per cent. of caustic soda solution of sulfite of soda from tank U. The beater drum 2, $2^a$ or $2^b$, and the circulating pumps B, B', will be put into operation at the desired stage of the process. The circulating pump G will be put into operation and the liquor caused to circulate in the direction of the arrows through the heater H and up through the chips till digestion and reduction to pulp or cellulose is completed. The temperature may be raised to 250° F., or higher if required, and at intervals more alkaline solution admitted from tank U. Gas under pressure may be admitted by pipe $p$ into the top of tank U for forcing the alkaline solution into tank A. Owing to the preliminary thorough preparation of the chips, the percentage of caustic soda, sulfite of soda or other chemical used for digesting the wood or other fibrous material, will be very much smaller than that required in the ordinary process. The heat and pressure will be much lower and the time will be much reduced for reducing the material to a good strong fiber pulp or cellulose.

The cellulose prepared as above described, freed from gums and resins, will be bleached to the desired extent with a comparatively small per cent. of chlorid of lime or other bleaching agent and thus great economy effected, while the cellulose will have greatly increased strength of fiber. The low heat and pressure employed in the digester also contribute to the strength of the fiber in the cellulose. Owing to the reduced amount of caustic soda and the shorter time required in digesting the prepared chips the fiber of the cellulose will have greater strength than that produced in the usual way.

After reduction of the fibrous material, by digestion with alkali or alkaline salt, to pulp or cellulose, has been completed, that is cooked in the digester A, I may draw off the alkaline liquor through pipe $l''$, and admit fresh warm or cold water through pipe N to the digester vat, and circulate such water repeatedly through the cellulose by means of pump G for washing out the alkali and dissolved or saponified oily or resinous matter. The first wash liquor may be drawn off and fresh water again admitted and circulated till the cellulose is sufficiently clean. The finished cellulose may be blown off through pipe $l'''$. By first extracting and removing the tannic acid from the wood, I prevent discoloration of the cellulose. The tannic acid if left in the treating tank combines with the fiber and becomes fixed so that it cannot be removed by ordinary washing, but must be

*k*. Gas is preferably burned in the fire chamber and is supplied by a pipe M having a valve *m* and a burner *m'* of any suitable kind in the fire chamber.

In order to secure satisfactory heating and circulation of liquid through the apparatus, the heater is located so that the top thereof is below the bottom of the treating vat or tank A. To the top of the heating coil is connected a return pipe L of the circulating system, and this pipe is also connected to the bottom of the treating tank A. The pipe L is provided with a check valve *l*. A check valve *g'* is also placed in the lower end of pipe *g* at its connection with the coil. These check valves prevent back flow of water from the tank. To pipe L is connected a blow-off pipe S, having a valve *s*, and connected with a storage and settling tank T. A water supply pipe N, having a valve *n*, connects with the top of tank A, or may connect at other desired part of the apparatus, as near the heating coils. A compression pump P will be used to draw gas from a holder or hot gas from a heater 8 through pipe Q and will connect by pipe *p'* with the top of the treating tank A and by the branch pipe *p*, having valve *r*, with the tank U. This elevated feed tank U for holding alkaline chemical or bleaching liquor is located adjacent to the treating tank or vat A, which is also used as a beating engine and digester. Tank U is provided with a cover *u*, and an outlet pipe *u'* having a valve *u''*, connecting with the top of tank A. A pipe *p* leading from the compression pump P, and having a valve *r'*, may connect with the top of tank U for supplying gas under pressure to force the alkaline or bleaching liquor into tank A.

I may construct the treating tank and beating engine in the modified form shown in Fig. 2, in which the vat or tank is composed of two vertical columns or compartments *y'*, *z'* and a bottom connecting body *w*. In this body is located the transverse beating drum 2ᵃ and a bed 3ᵇ. The columns are connected near the top by a circulating pipe *b'* in which is connected a rotary pump B', and also having a check valve *b''*. An elevated feed tank U for alkaline reducing agent or a bleaching agent, and having pipe connections as before described is connected to the top of one of the columns. A pipe C', having a valve *c'*, for discharging circulating water connects the upper ends of the columns and the water discharge pipe C, having valve *c*, connects at the same level with the other column and leads to an expansion and deposit chamber D, D', as shown in Fig. 1. A treating vat and beating engine constructed substantially as shown in Fig. 3 may also be used. Here the ordinary drum 2ᵇ and bed knives 3ᶜ are employed in connection with a horizontal mid-feather *b'''*. Circulation of hot solvent liquor through the vat is effected by a circulating pump G, as shown in Fig. 1. A screen plate I, having a movable section *i* will preferably be placed below the mouthpiece *a*. A screen I is also placed over the opening to the discharge pipe C in the devices shown in Figs. 1 and 2.

In operating the apparatus shown in Fig. 1, for carrying out my process, the tank A is partially filled with chips of wood or suitably cut fibrous plant material through the mouthpieces *a*, and the top covers are closed and secured in place. The chips are preferably made by cutting the wood across the grain, and may be about an inch thick. Now the whole system, including tank or vat A, chamber D, D' and the coils, is filled with water admitted by pipe N and caused to rise to the level of the discharge pipe C at its connection with the expansion chamber D. Gas is then admitted to the burner *m'* and lighted, and the circulating pump G is started. This causes the circulation of water through the heating coils and thence up through the treating and distilling tank A in contact with the wood chips. I first proceed to extract and remove tannic acid from the wood by circulating water at a temperature between 120° F. and 170° F, through the body of chips or plants in the tank or vat A. Circulation of water at this low temperature is continued till all, or most, of the tannic acid has been extracted, then this acid solution is drawn off into a tank T by opening valves *s'* in pipe S'. The system is again filled with water and pump G put in operation and the heat increased in the furnace K. As the circulating water becomes heated, approximately to 212° F., some of the fatty acids are produced and pass with the water into the heating coils. As the temperature of the water is gradually raised, other fatty acids, gases and products of decomposition are formed and diffuses through the water. The hot circulating water and the solvent fatty acids soon commence to dissolve the cellular structure and release the turpentine, volatile oil and gummy matter from the wood chips or plants. The turpentine and oil vapor pass with the water or liquor into chamber D, D', where the volatile vapors separate and fill the vapor space D from which they pass off through pipe *e* to the condenser E, where condensation is effected. At the same time the circulating water containing resin or gum which has been released from the wood or plant material is passed down over the separating dome F, where such resin or gum is separated and caused to settle into the depositing chamber D', where it collects, while the water passes up through the separator dome F, and thence by pipe *f*, the circulating pump G, and pipe *g*, into the bottom of the heating coils. By circulating the removed by chemical treatment, entailing additional expense for chemicals and requiring additional time for treatment.

Strength, toughness and elasticity are characteristic of the fiber. in the cellulose produced by my process.

Having described my invention, what I claim, and desire to secure by Letters Patent, is:—

1. The process of making cellulose which consists in subjecting woody or vegetable fibrous material in a closed chamber to the action of hot water circulated in contact therewith, and in the same chamber subjecting the softened material to the action of a beating drum, drawing off with the circulating water the extracted gummy and resinous material and separating and collecting the same, and continuing the circulation of water and the beating and grinding operation till the material is reduced to cellulose.

2. The process of treating woody or vegetable fibrous material to make cellulose, which consists in subjecting it in a closed chamber to the action of warm or hot water, circulating the water repeatedly in contact with the material and through a heater, thereby agitating and macerating the material till the natural constituents are extracted, at the same time subjecting the material to the action of a beating drum, then drawing off the water and extract, then adding to the cleaned material fresh water and an alkaline chemical and circulating the same through and in contact with the material till reduced to cellulose.

3. The process of making cellulose, which consists in subjecting wood or vegetable fibrous material in a closed tank to the action of hot water, thereby forming fatty acids and other solvents, causing the water and acids to circulate in contact with the material and release the volatile matter, oil, rosin and gummy matter, and at the same time distilling off the volatile oily vapors and passing the rosin and gum off with the water and separating and collecting the same, subjecting the softened material to beating and grinding in the same tank till sufficiently cleaned, then drawing off the treating liquor and admitting water and alkaline chemical and beating, grinding and digesting the material till reduced to cellulose.

4. The process of making cellulose, which consists in subjecting the wood in a closed tank to the action of hot water at a temperature which will develop or form fatty acids, circulating the water and fatty acids diffused therein from the treating tank through a heater and thence in contact with the wood for releasing and extracting turpentine, oils, rosin and gummy matter, distilling off and condensing the turpentine and oil vapors, and carrying off the rosin with the circulating water and collecting it in a separate tank, subjecting the softened wood to beating and grinding in the liquor in the same tank, blowing off the treating liquor, then adding fresh water and alkaline chemical to the cleaned material and digesting the same till reduced to cellulose.

5. The process of making cellulose, which consists in first extracting and removing tannic acid from woody or vegetable fibrous material by circulating warm or hot water in contact with the material, then drawing off the resulting tannic acid solution, then adding fresh water or liquor containing fatty acid and circulating it in contact with the material at an increased temperature, approximating 250° F. and thereby dissolving resinous and gummy material, distilling off the volatile matter and drawing off with the water the resinous and gummy material and separating and recovering the same till the fibrous material is cleaned, then drawing off the fatty acid liquor and adding water and alkali and reducing the material to cellulose.

In testimony whereof I affix my signature in presence of two witnesses.

BURDETT LOOMIS.

Witnesses:
  JENNIE H. EVANS,
  JAMES L. CROWLEY.